United States Patent
Lyu et al.

(10) Patent No.: US 7,826,678 B2
(45) Date of Patent: Nov. 2, 2010

(54) ADAPTIVE IMAGE SHARPENING METHOD

(75) Inventors: Szu-Hao Lyu, Taoyuan County (TW); Meng-Yun Ying, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 931 days.

(21) Appl. No.: 11/551,727

(22) Filed: Oct. 23, 2006

(65) Prior Publication Data
US 2008/0002904 A1 Jan. 3, 2008

(30) Foreign Application Priority Data
Jun. 30, 2006 (TW) .............................. 95123789 A

(51) Int. Cl.
*G06K 9/40* (2006.01)
(52) U.S. Cl. .................... 382/263; 382/264; 382/260; 382/275
(58) Field of Classification Search .............. 382/264, 382/260, 275, 263
See application file for complete search history.

(56) References Cited

U.S. PATENT DOCUMENTS

| | | | | |
|---|---|---|---|---|
| 4,571,635 A * | 2/1986 | Mahmoodi et al. | ........... | 358/510 |
| 5,038,388 A * | 8/1991 | Song | ........................... | 382/266 |
| 5,081,692 A * | 1/1992 | Kwon et al. | ................. | 382/263 |
| 5,524,070 A * | 6/1996 | Shin et al. | .................... | 382/274 |
| 5,524,162 A * | 6/1996 | Levien | ......................... | 382/263 |
| 6,195,467 B1 * | 2/2001 | Asimopoulos et al. | ...... | 382/261 |
| 6,252,995 B1 * | 6/2001 | Takamori | ..................... | 382/254 |
| 6,965,702 B2 * | 11/2005 | Gallagher | ................... | 382/266 |
| 7,110,607 B2 * | 9/2006 | Fujimoto et al. | ............ | 382/237 |
| 7,111,509 B2 * | 9/2006 | Laun | ......................... | 73/290 V |
| 7,228,004 B2 * | 6/2007 | Gallagher et al. | ........... | 382/274 |
| 7,269,300 B2 * | 9/2007 | Braun et al. | ................. | 382/298 |
| 7,565,007 B2 * | 7/2009 | Ishiga | ......................... | 382/162 |
| 7,570,831 B2 * | 8/2009 | Shaked et al. | ............... | 382/260 |
| 2008/0002904 A1 * | 1/2008 | Lyu et al. | ..................... | 382/266 |

\* cited by examiner

*Primary Examiner*—Yubin Hung
*Assistant Examiner*—Avinash Yentrapati
(74) *Attorney, Agent, or Firm*—Winston Hsu; Scott Margo; Min-Lee Teng

(57) ABSTRACT

The invention discloses an adaptive image sharpening method for generating a sharpened image area corresponding to an original image area. The original image area includes a plurality of original pixel values. The method includes blurring the original image area to generate a plurality of blurred pixel values corresponding to the plurality of original pixel values respectively, calculating a plurality of characteristic values corresponding to the plurality of original pixel values respectively, statistically analyzing the plurality of characteristic values to generate a plurality of weighting values corresponding to the plurality of original pixel values respectively, and generating a plurality of sharpened pixel values according to the plurality of original pixel values, the plurality of blurred pixel values, and the plurality of weighting values. The plurality of sharpened pixel values constitutes the sharpened image area.

9 Claims, 1 Drawing Sheet

ADAPTIVE IMAGE SHARPENING METHOD

BACKGROUND OF THE INVENTION

1. Field of the Invention

The present invention relates to image sharpening, and more particularly, to an image sharpening method that utilizes dynamically determined weighting values during an image sharpening process.

2. Description of the Prior Art

Un Sharp Mask (USM) is a technology that allows images to be sharpened. The technology first utilizes a mask, such as a Gaussian mask, to generate a blurred image corresponding to an original image. The blurred image is then subtracted from the original image to obtain a detailed image corresponding to the original image. Finally, the original image is combined with a product of the detailed image and a fixed weighting value to obtain a sharpened image corresponding to the original image. The following equation illustrates the concept of USM.

$$P_{SHARP} = P_{ORIGINAL} + \alpha(P_{ORIGINAL} - P_{BLUR}),$$

where $\alpha$ is the fixed weighting value, $P_{ORIGINAL}$ is an original pixel value of the original image, $P_{BLUR}$ is a blurred pixel value of the blurred image and corresponds to the original pixel value, $(P_{ORIGINAL} - P_{BLUR})$ represents a detailed pixel value in the detailed image and corresponds to the original pixel value $P_{ORIGINAL}$, and $P_{SHARP}$ is a sharpened pixel value of the sharpened image and corresponds to the original pixel value $P_{ORIGINAL}$.

In the related art, a single weighting value $\alpha$ is utilized to sharpen all the pixels of an original image. If the weighting value $\alpha$ is too small, the sharpened image will be too similar to the original image so that the sharpening result is non-ideal. On the other hand, if the weighting value $\alpha$ is too large, some areas of the sharpened image will be distorted and become too artificial for human perception.

SUMMARY OF THE INVENTION

The embodiment of the present invention discloses an adaptive image sharpening method for generating a sharpened image area corresponding to an original image area. The original image area includes a plurality of original pixel values. The method comprises: blurring the original image area to generate a plurality of blurred pixel values corresponding to the plurality of original pixel values respectively, calculating a plurality of characteristic values corresponding to the plurality of original pixel values respectively, statistically analyzing the plurality of characteristic values to accordingly generate a plurality of weighting values corresponding to the plurality of original pixel values respectively, and generating a plurality of sharpened pixel values according to the plurality of original pixel values, the plurality of weighting values, and the plurality of blurred pixel values. The plurality of sharpened pixel values constitutes the sharpened image area.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
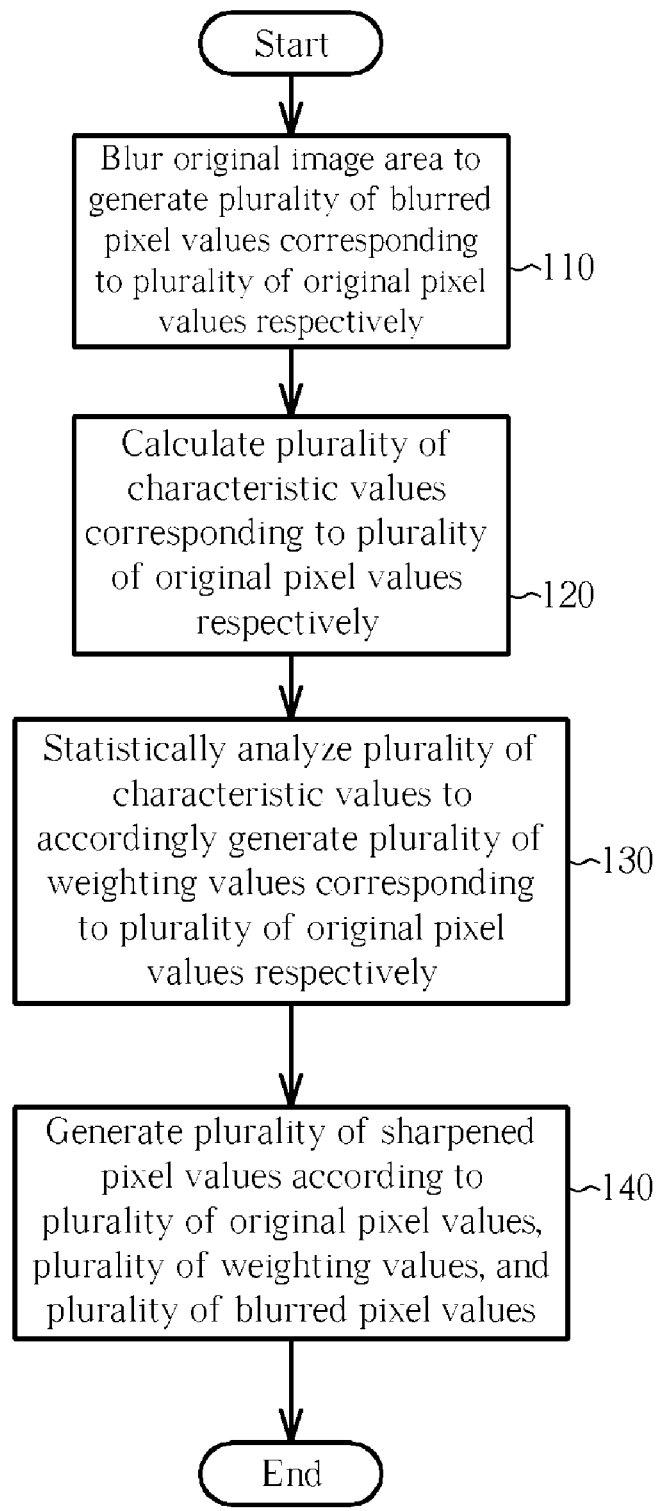
FIG. 1 shows an exemplary flowchart according to the adaptive image sharpening method of the present invention.

FIG. 1 shows an exemplary flowchart according to the adaptive image sharpening method of the present invention. The adaptive image sharpening method allows a sharpened image area corresponding to an original image area to be generated, where the original image area could be a sub-area of an original image and the sharpened image area could be a sub-area of a sharpened image. The sharpened image is a result generated through applying the adaptive image sharpening method to the whole original image. Specifically, the original image area comprises a plurality of original pixel values. For example, the original image area may comprise eight original pixel values $P_{ORIGINAL\_1}$, $P_{ORIGINAL\_2}$, ..., $P_{ORIGINAL\_7}$, and $P_{ORIGINAL\_8}$ lying in eight locations $(x, y)$, $(x+1, y)$, ..., $(x+6, y)$, and $(x+7, y)$ of the original image. The sharpened image area may comprise eight sharpened pixel values $P_{SHARP\_1}$, $P_{SHARP\_2}$, ..., $P_{SHARP\_7}$, and $P_{SHARP\_8}$ lying in eight locations $(x, y)$, $(x+1, y)$, ..., $(x+6, y)$, and $(x+7, y)$ of the sharpened image. The flowchart shown in FIG. 1 includes the following steps:

Step 110: Blur the original image area to generate a plurality of blurred pixel values $P_{BLUR\_1}$~$P_{BLUR\_8}$ corresponding to the plurality of original pixel values $P_{ORIGINAL\_1}$~$P_{ORIGINAL\_8}$ respectively. Every kind of image-blurring mask can be used in this step to blur the original image area. For example, for an integer lying between one and eight, $P_{BLUR\_X}$ can be generated through using a Gaussian mask to perform a convolution operation centered at $P_{ORIGINAL\_X}$. Since the Gaussian mask and other image-blurring masks are well known image-processing masks, further description of them will be omitted herein.

Step 120: Calculate a plurality of characteristic values $CV_1$~$CV_8$ corresponding to the plurality of original pixel values $P_{ORIGINAL\_1}$~$P_{ORIGINAL\_8}$ respectively. In this step, one or more masks selected from a group consisting of gradient masks, curvature masks, sharpen masks, and blur masks are used. For example, six masks, including a horizontal gradient mask, a vertical gradient mask, a horizontal curvature mask, a vertical curvature mask, a sharpen mask, and a blur mask can be used. For an original pixel value $P_{ORIGINAL\_X}$, the six masks are used to perform convolution operations centered at $P_{ORIGINAL\_X}$ to obtain six convolution values $CV_{X\_1}$~$CV_{X\_6}$ corresponding to $P_{ORIGINAL\_X}$. The characteristic value $CV_X$ is then determined based upon the six convolution values $CV_{X\_1}$~$CV_{X\_6}$. For instance, the average of the six convolution values $CV_{X\_1}$~$CV_{X\_6}$ can be used as the characteristic value $CV_X$ corresponding to $P_{ORIGINAL\_X}$. In other words, $CV_X = (CV_{X\_1} + CV_{X\_2} + CV_{X\_3} + CV_{X\_4} + CV_{X\_5} + CV_{X\_6})/6$. Since the gradient masks, curvature masks, sharpen masks, and blur masks are well known image processing masks, further description of them will be omitted herein.

Step 130: Statistically analyze the plurality of characteristic values $CV_1$~$CV_8$ to accordingly generate a plurality of weighting values $\alpha_1$~$\alpha_8$ corresponding to the plurality of original pixel values $P_{ORIGINAL\_1}$~$P_{ORIGINAL\_8}$ respectively. This step may include the following sub-steps: (a) Calculate an average value AV and a standard deviation SD of the characteristic values $CV_1$~$CV_8$. (b) Define a plurality of difference ranges based on the standard deviation SD. For example, in sub-step (b), 0~0.5*SD, 0.5*SD~1*SD, 1*SD~1.5*SD, 1.5*SD~2*SD, 2*SD~2.5*SD, 2.5*SD~3*SD, 3*SD~3.5*SD, 3.5*SD~4*SD, and higher than 4*SD can be defined as a first, a second, a third, a fourth, a fifth, a sixth, a seventh, an eight, and a ninth difference range, respectively. (c) For each original pixel value $P_{ORIGINAL\_X}$ of the plurality of original pixel values $P_{ORIGINAL\_1} \sim P_{ORIGINAL\_8}$, calculate an absolute difference $AD_X$ between the characteristic values $CV_X$ and the average value AV. In other words, $AD_X$=abs($CV_X$–AV). (d) Determine which of the plurality of difference ranges the absolute difference ADx lies in, and accordingly determine a weighting value $\alpha_X$ for the original pixel value $P_{ORIGINAL\_X}$. For example, when the absolute difference $AD_X$ lies in an $n^{th}$ difference range of the plurality of difference ranges, an $n^{th}$ predetermined weighting values $\alpha_{PREDETERMINED\_n}$ is utilized as the weighting values $\alpha_X$. The nine predetermined weighting values $\alpha_{PREDETERMINED\_1} \sim \alpha_{PREDETERMINED\_8}$ can be determined according to experimental results or sharpening requests. In step 130, the weighting values $\alpha_1 \sim \alpha_8$ corresponding to the original pixel values $P_{ORIGINAL\_1} \sim P_{ORIGINAL\_8}$ are allowed to be different from each other. This serves as one of the major differences between the method of the present invention and that of the related art.

Step 140: Generate a plurality of sharpened pixel values $P_{SHARP\_1} \sim P_{SHARP\_8}$ according to the plurality of original pixel values $P_{ORIGINAL\_1} \sim P_{ORIGINAL\_8}$, the plurality of weighting values $\alpha_1 \sim \alpha_8$, and the plurality of blurred pixel values $P_{BLUR\_1} \sim P_{BLUR\_8}$. More specifically, each one of the plurality of sharpened pixel values $P_{SHARP\_1} \sim P_{SHARP\_8}$ can be determined through the following equation:

$$P_{SHARP\_X} = P_{ORIGINAL\_X} + \alpha_X (P_{ORIGINAL\_X} - P_{BLUR\_X}), X=1\sim8$$

In the method shown in FIG. 1, different weighting values $\alpha$ are utilized to sharpen pixels with different characteristic values. In setting the predetermined weighting values $\alpha_{PREDETERMINED\_1} \sim \alpha_{PREDETERMINED\_9}$, the following principals can be referenced: (a) larger weighting values can be assigned to pixels located on edges or smooth areas; and (b) smaller weighting values can be assigned to pixels located in areas having minor pixel value variation. Through an experiment, it can be confirmed that the method of the present invention provides a more natural sharpened image with lesser artifacts.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer readable medium embedded with a computer program for performing an adaptive image sharpening method, for generating a sharpened image area corresponding to an original image area, the original image area including a plurality of original pixels, wherein the computer program readable medium performs the following steps:

blurring the original image area to generate a plurality of blurred pixels corresponding to the plurality of original pixels respectively;

calculating a plurality of characteristic values based on the values of the plurality of original pixels, wherein each of the pixels has one corresponding characteristic value;

for each original pixel, statistically analyzing the plurality of characteristic values corresponding to the plurality of original pixels to generate a plurality of weighting values that respectively correspond to the plurality of original pixels; and generating a plurality of sharpened pixels according to the plurality of original pixels, the plurality of weighting values, and the plurality of blurred pixels;

wherein the plurality of sharpened pixels constitute the sharpened image area.

2. The computer readable medium embedded with a computer program of claim 1, wherein the step of blurring the original image area to generate a plurality of blurred pixels corresponding to the plurality of original pixels respectively comprises:

utilizing a Gaussian mask to blur the original image area to generate the plurality of blurred pixels corresponding to the plurality of original pixels respectively.

3. The computer readable medium embedded with a computer program of claim 1, wherein the step of calculating a plurality of characteristic values corresponding to the plurality of original pixels respectively comprises:

each one of the plurality of original pixels, utilizing a plurality of masks to perform convolution operations centered on the original pixel to generate a plurality of convolution values; and calculating a characteristic value corresponding to the original pixel according to the plurality of convolution values.

4. The computer readable medium embedded with a computer program of claim 3, wherein the step of calculating a characteristic value corresponding to the original pixel according to the plurality of convolution values comprises:

calculating an average value of the plurality of convolution values and utilizing the calculated average value as the characteristic value corresponding to the original pixel.

5. The computer readable medium embedded with a computer program of claim 3, wherein the plurality of masks is selected from a group consisting of gradient masks, curvature masks, sharpen masks, and blur masks.

6. The computer readable medium embedded with a computer program of claim 3, wherein the plurality of masks comprises a horizontal gradient mask, a vertical gradient mask, a horizontal curvature mask, a vertical curvature mask, a sharpen mask, and a blur mask.

7. The computer readable medium embedded with a computer program of claim 1, wherein the step of, for each original pixel, statistically analyzing the plurality of characteristic values to accordingly generate a plurality of weighting values that respectively correspond to the plurality of original pixels comprises:

calculating an average value and a standard deviation of the plurality of characteristic values;

defining a plurality of difference ranges according to the standard deviation; and for each one of the plurality of original pixels, determining which of the plurality of difference ranges an absolute difference between the average value and a characteristic value of the original pixel lies in, and accordingly determining a weighting value corresponding to the original pixel.

8. The computer readable medium embedded with a computer program of claim 7, wherein the step of determining which of the plurality of difference ranges an absolute difference between the average value and a characteristic value of the original pixel lies in, and accordingly determining a weighting value corresponding to the original pixel comprises:

utilizing a first predetermined weighting value as the weighting value corresponding to the original pixel when the absolute difference lies in a first difference range of the plurality of difference ranges; and utilizing a second predetermined weighting value as the weighting value corresponding to the original pixel when the absolute difference lies in a second difference range of the plurality of difference ranges;

wherein the first predetermined weighting value is different from the second predetermined weighting value.

9. The computer readable medium embedded with a computer program of claim 1, wherein the step of generating a plurality of sharpened pixels according to the plurality of original pixels, the plurality of weighting values, and the plurality of blurred pixels comprises:

for each one of the plurality of original pixels, subtracting a blurred pixel corresponding to the original pixel from the original pixel to generated a detailed image value;

multiplying the detailed image value by a weighting value corresponding to the original pixel; and adding the pixel and a product of the detailed pixel and the weighting value to generate a sharpened pixel corresponding to the original pixel.

* * * * *